(12) United States Patent
Zivkovic et al.

(10) Patent No.: US 8,976,005 B2
(45) Date of Patent: Mar. 10, 2015

(54) MOVEMENT HISTORY ASSURANCE FOR SECURE PASSIVE KEYLESS ENTRY AND START SYSTEMS

(71) Applicant: NXP B.V., Eindhoven (NL)

(72) Inventors: Zoran Zivkovic, 's-Hertogenbosch (NL); Jan René Brands, Nijmegen (NL); Frank Harald Erich Ho Chung Leong, Veldhoven (NL); Stefan Drude, Waalre (NL)

(73) Assignee: NXP B.V., Eindhoven (NL)

( * ) Notice: Subject to any disclaimer, the term of this patent is extended or adjusted under 35 U.S.C. 154(b) by 193 days.

(21) Appl. No.: 13/898,309

(22) Filed: May 20, 2013

(65) Prior Publication Data

US 2014/0340193 A1 Nov. 20, 2014

(51) Int. Cl.
*G07C 9/00* (2006.01)

(52) U.S. Cl.
CPC ........ *G07C 9/00111* (2013.01); *G07C 2209/63* (2013.01); *G07C 2009/00539* (2013.01); *G07C 2009/00555* (2013.01)
USPC ..................................................... 340/5.61

(58) Field of Classification Search
CPC ........... G07C 2009/00555; G07C 2009/00539; G07C 2209/63
See application file for complete search history.

(56) References Cited

U.S. PATENT DOCUMENTS

2013/0116964 A1    5/2013   van Roermund et al.
2014/0220888 A1*   8/2014   Shimshoni .................. 455/41.1
2014/0303811 A1*  10/2014   Ledendecker .................... 701/2

OTHER PUBLICATIONS

Francillon, A. et al. "Relay Attacks on Passive Keyless Entry and Start Systems in Modern Cars", 18th Network and Distributed System Security Symposium, The Internet Society (2011), 15 pgs.
Capkun, S. et al. Relay Attacks on Passive Keyless Entry and Start Systems in Modern Cars, Presentation—Eidgenossische Technische Hochshule Zurich, Dept. of Computer Science, 40 pgs. (May 11, 2011).
U.S. Appl. No. 13/344,838, specification & drawings, 24 pgs. (filed Jan. 6, 2012).

* cited by examiner

*Primary Examiner* — Andrew Bee

(57) ABSTRACT

A passive keyless system including a base that selectively allows access to a restricted environment through a base transceiver operating with an encrypted link on first and second frequencies, and a base recording element storing base measured movement history information. Also, a passive keyless device with at least one sensor detects a movement property of the device, a device recording element stores movement history information about the device and reflecting the detected movement property, and a device transceiver communicating with the base transceiver, and transmitting to the base transceiver encrypted security information identifying the device in accordance with a passive keyless protocol and/or the movement history information, and an access request element that causes the device transceiver to request access to the base transceiver. The base uses the base measured movement history information and movement history information when allowing access to the restricted environment.

20 Claims, 5 Drawing Sheets

MOVEMENT HISTORY ASSURANCE FOR SECURE PASSIVE KEYLESS ENTRY AND START SYSTEMS

FIELD OF THE INVENTION

Aspects of the present disclosure relate to apparatuses, devices, and methods involving passive keyless entry and start (PKES) systems and the like. More generally, this invention relates to communication systems where communication with at least one movable node can be secured. An example of such a system is a keyless entry system for home use.

Passive keyless entry and start systems are vulnerable to attacks such as relay attacks. In relay attacks, messages from a legitimate system user, such as an operator of a vehicle or an occupant of a building (hereafter "operator/owner"), are relayed by an "intervening" sender to a valid receiver of the message, such as the vehicle. Communication by the "intervening" sender often takes place via an alternate communication channel, such as a cable typically used by the relay attacker. Such attacks can take place over a distance greater than the distance at which the PKES transmitter carried by the user and the base unit in the vehicle normally can interact. By "intervening" sender it is meant that the sender is a party other than the party whom the valid receiver expected to receive a message from, or, in other words, the "intervening" sender is an "unauthorized" sender. A discussion of such relay attacks can be found in Francillon et al., "Relay Attacks on Passive Keyless Entry and Start Systems in Modern Cars," Eidgenossische Technische Hochshule Zurich, Dept. of Computer Science (2011).

For example, a relay attack might occur in an elevated parking garage while a car owner carrying their PKES device waits by the elevator, a substantial distance from their car, to descend to street level. In the relay attack, a thief relays signals between the car and the PKES device carried by the owner waiting at the elevator to cause the car to open and/or start. Due to the distance between the user and the car, the user is not aware that the car has opened and/or started, allowing the thief to abscond with the car.

For the purpose of this explanation, "close" means the PKES device and car are separated by less than a distance which would render unfeasible a relay attack scheme due to the authorized vehicle user becoming aware that the vehicle had been opened and/or started, e.g. 1-5 meters. Current business practice is such that "close" is more preferably construed to mean about 2 meters.

Proximity measurement can be added to a PKES system with the intent of thwarting relay attacks. In such a scheme, the link between the two PKES system devices is only deemed to be trustworthy (that is, legitimate) if it is determined that the two devices (e.g. key and the door/car) are indeed close to each other; relay attacks typically take place only when the key is sufficiently far from the car so that the legitimate user carrying the key does not detect that the car has opened/started due to such an attack and/or see the person(s)/equipment which are involved with the relay attack. So if it can be determined that the key is far from the car, it can be inferred that a relay attack is taking place. If it can be determined that the key is near the car, one can presume that a relay attack is not taking place.

By way of example only, large-bandwidth radio signals (e.g., at least 100 MHz) could be a way to measure the proximity of the key to the vehicle. Passive keyless entry and start systems work often on lower frequencies which enable also some longer distance communication services with the car. However, for accurate proximity measurements higher frequencies are preferred, as the large bandwidth required for such measurements is available at those frequencies. As a result, for practical reasons, accurate proximity measurements usually would be performed with an additional link (preferably higher-bandwidth) separate from the low-frequency link employed by the system for normal operation, and using the Time-of-Flight ("ToF") principle.

However, if this additional link is not secured it is also vulnerable to relay attacks where the signal is returned from a fake transmitter simulating a nearby device. Encrypting this additional link creates additional technical issues, since it increases the complexity of the system, and can compromise the accuracy of the proximity measurements.

The use of sensors in PKES-type systems for key wake-up is known, as taught, for example, in commonly-assigned U.S. patent application Ser. No. 13/344,838 (not yet published), the contents of which are incorporated by reference herein, to Leong, et al. Such use, however, does not relate to the invention.

SUMMARY OF THE INVENTION

One example embodiment involves a passive keyless device for selectively accessing a restricted environment of a base (here, "passive keyless devices" refers to devices which can open and/or otherwise control a secure location such as a car or building, and "device" refers to a portable handheld item such as a key fob or smartphone). The device includes at least one sensor configured to detect a movement property of the device, a recording element configured to store movement history information regarding the device, the movement history information reflecting the movement property detected by the sensor over a period of time, a transceiver configured to communicate with the base, and transmit to the base at least one of encrypted security information identifying the passive keyless device in accordance with a passive keyless protocol, and the movement history information, and an access request element configured to cause the transceiver to send a request for access to the base.

In such a passive keyless device, the sensor can include at least one of an accelerometer, a gyroscope, and a compass.

Also, such a passive keyless device can have a hash value generator, the hash value generator being configured to derive a hash value from the movement history information, and the transceiver being configured to send the hash value to the base.

The hash value generator can employ at least one of MD5 and SHA-256 cryptographic hash functions.

In the passive keyless device, the transceiver can be further configured to receive from the base at least one of a base measured movement history information for the passive keyless device and a base hash value corresponding to the base measured movement history information. In this case, the device can have a controller which inhibits the access request element if at least one of the base measured movement history information and the base hash value received from the base differ by more than predetermined amounts from the movement history information and the hash value. The hash values should be exchanged before the movement histories.

In the passive keyless entry device, the hash value can be sent by the transceiver before the movement history is sent by the transceiver.

In the passive keyless device, selectively accessing the restricted environment can involve at least one of opening a vehicle door, starting a vehicle engine, and opening a building door.

Another example embodiment can involve a passive keyless system having a base configured to selectively allow access to a restricted environment. The base can have a base transceiver configured to operate using an encrypted link on a first frequency associated with security information and a second frequency associated with distance measurement information, and a base recording element configured to store base measured movement history information based upon the distance measurement information. The system also can have a passive keyless device with at least one sensor configured to detect a movement property of the device, a device recording element configured to store movement history information regarding the device, the movement history information reflecting the movement property detected by the sensor over a period of time, and a device transceiver configured to communicate with the base transceiver, and transmit to the base transceiver at least one of encrypted security information identifying the device in accordance with a passive keyless protocol, and the movement history information, and an access request element configured to cause the device transceiver to send a request for access to the base transceiver. The base can be configured to use the base measured movement history information and the movement history information when allowing access to the restricted environment.

In such a passive keyless system, the sensor can have at least one of an accelerometer, a gyroscope, and a compass.

The passive keyless system also can include a base hash value generator which is part of the base, and a device hash value generator which is part of the device. The base hash value generator can be configured to derive a base hash value from the base measured movement history, and the device hash value generator can be configured to derive a device hash value from the movement history information. The device transceiver can be configured to send to the base transceiver at least one of the device hash value and the movement history information, and the base is configured to use at least one of the received device hash value and the movement history information when allowing access to the restricted environment. The hash values should be exchanged before the movement histories.

In this passive keyless system, the base can deny the request for access if at least one of the base measured movement history information and the base hash value differ by more than predetermined amounts from the movement history information and the device hash value. The hash values should be exchanged before the movement histories.

In the passive keyless system, the base hash value generator and the device hash value generator both can employ at least one of a MD5 cryptographic hash function and a SHA-256 cryptographic hash function.

In the passive keyless entry system, the device hash value can be sent by the device transceiver before the movement history information is sent by the device transceiver.

The passive keyless system also can have a controller that is part of the passive keyless device and which is configured to inhibit the access request element if at least one of the base measured movement history information and the base hash value differ by more than predetermined amounts from the movement history information and the hash value.

In such a passive keyless system, allowing selective access to the restricted environment can include at least one of opening a vehicle door, starting a vehicle engine, and opening a building door.

Another example embodiment concerns a method of controlling access to a restricted environment through use of a passive keyless device and a base located proximate to the restricted environment. This involves detecting a movement property of the device, storing, at the device, device movement history regarding the device, the device movement history reflecting the movement property detected over a period of time, measuring, at the base, movement of the device over the period of time, storing, at the base, a base measured movement history of the device reflecting the movement of the device over the period of time, transmitting from the device to the base at least one of encrypted security information identifying the device in accordance with a passive keyless protocol, and the device movement history, and using, at the base, the base measured movement history and the device movement history to control access to the restricted environment. The base and device exchange access security information using an encrypted link on a first radio frequency, and the measuring, at the base, uses a second radio frequency.

This method can also involve deriving, at the base, a base hash value using the base measured movement history, deriving, at the device, a device hash value using the device movement history, sending to the base at least one of the device hash value and the device movement history, and using at least one of the device hash value and the device movement history to control access to the restricted environment.

The method also can involve denying access to the restricted environment if at least one of the base measured movement history and the base hash value differ by more than predetermined amounts from the device movement history and the device hash value.

In the method, the device hash value can be sent before the device movement history information is sent.

In the method, selectively accessing a base can include at least one of opening a vehicle door, starting a vehicle engine, and opening a building door.

BRIEF DESCRIPTION OF THE DRAWINGS

The invention will be described in greater detail hereinafter with reference to example embodiments depicted in the accompanying drawings, described below, and which are illustrative and to which the invention is not limited.

DETAILED DESCRIPTION OF EXEMPLARY EMBODIMENTS

Figure 1:
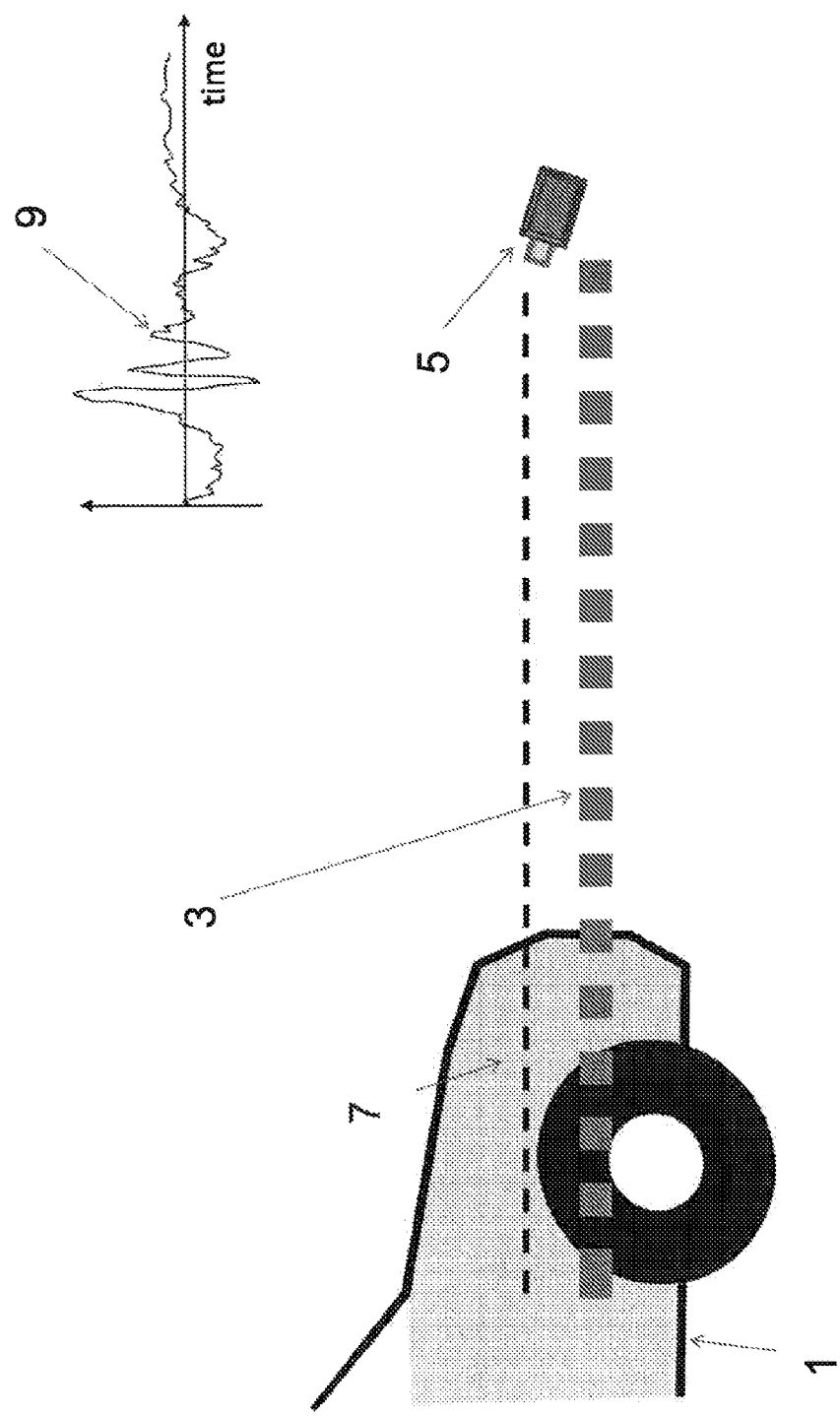
FIG. 1 is a schematic view depicting a passive keyless entry and start system in accordance with an embodiment of this invention.

The following description of the embodiments focuses by way of example only and not limitation on a PKES system suitable for use in with automobile. While this system is particularly useful for automotive door and/or startup access systems, other fields of use, such as building security, aviation, astronautical and nautical use are contemplated. The vehicle or space to which access is limited can be thought of as a restricted environment.

Described herein is a way, for systems that use an additional link for proximity assurance, to render the link secure without requiring encryption of the link which might otherwise compromise the accuracy of proximity measurements taken using that link. Such a simplified proximity measuring link can also reduce the costs of the system and/or the power consumed by the key, both of which can be important considerations.

Moreover, if the additional link for proximity assurance is encrypted, this invention provides a further level of security through the detection of the physical movements of the key in the vicinity of the automobile, which can be treated as a physically unclonable function.

Particular aspects of this invention include the following:

In accordance with the invention, a proximity check is employed in a passive keyless system to provide reliable proximity assurance using local authentication. Such proximity assurance is achieved by introducing additional sensors such as a MEMS accelerometer, gyroscope and/or compass (as well as using more than one of such sensors) on one side of the access system, in what is treated as the movable member, e.g. the key. Such a sensor(s) is (are) used to measure the spatial movement history of the key in order to determine whether the key is near the location where entry is desired (the "base communication side").

Spatial movement history refers to at least one function of a movable member (e.g. key) which varies with time if the movable member changes position. For example, the spatial movement history could involve the acceleration of the key in a particular direction, the vector sum of all accelerations, or the orientation of the key relative to a particular direction such as north.

A radio link is used at the base communication side, e.g. a car or door, to measure the movement history of the key using, for example, time of flight measurements. Time of flight measurements could be processed by the base communication side device, in known fashion, to derive the distance and/or acceleration of the key relative to the base communication side.

Thus, the base communication side device can check for a match between the key movement history measured by the key and the key movement history determined by the base communication side as an additional security measure to prevent relay attacks (alternatively, a third part of the system such as a remote management entity could perform this check). This check works because the two different movement histories will differ when a relay attack takes place.

More specifically, the exchange of movement histories is typically triggered by measuring the distance between the car and key and finding the distance to be "close enough" to have the car open its doors (e.g. less than 2 m). When this happens the histories are exchanged to check if the "close enough" conclusion was indeed true and not faked by relay attack. In other words, the distance between the key and car can be used for opening the car but the movement histories are used to as a check to verify that the distance has not been faked by a relay attack. This verification works because the movement history of the key as the person holding the key approaches the car is always unique and different.

In accordance with the invention, communication links in systems where at least one of the sides of a given system such as a key or other portable device is moving with a user and communicating with static infrastructure such as a vehicle or building may be secured against attacks such as relay attacks. Measuring the movements of one side by both communication sides independently provides a movement history which can serve as an additional physically unclonable security measure and thereby thwart relay attacks.

Figure 2:
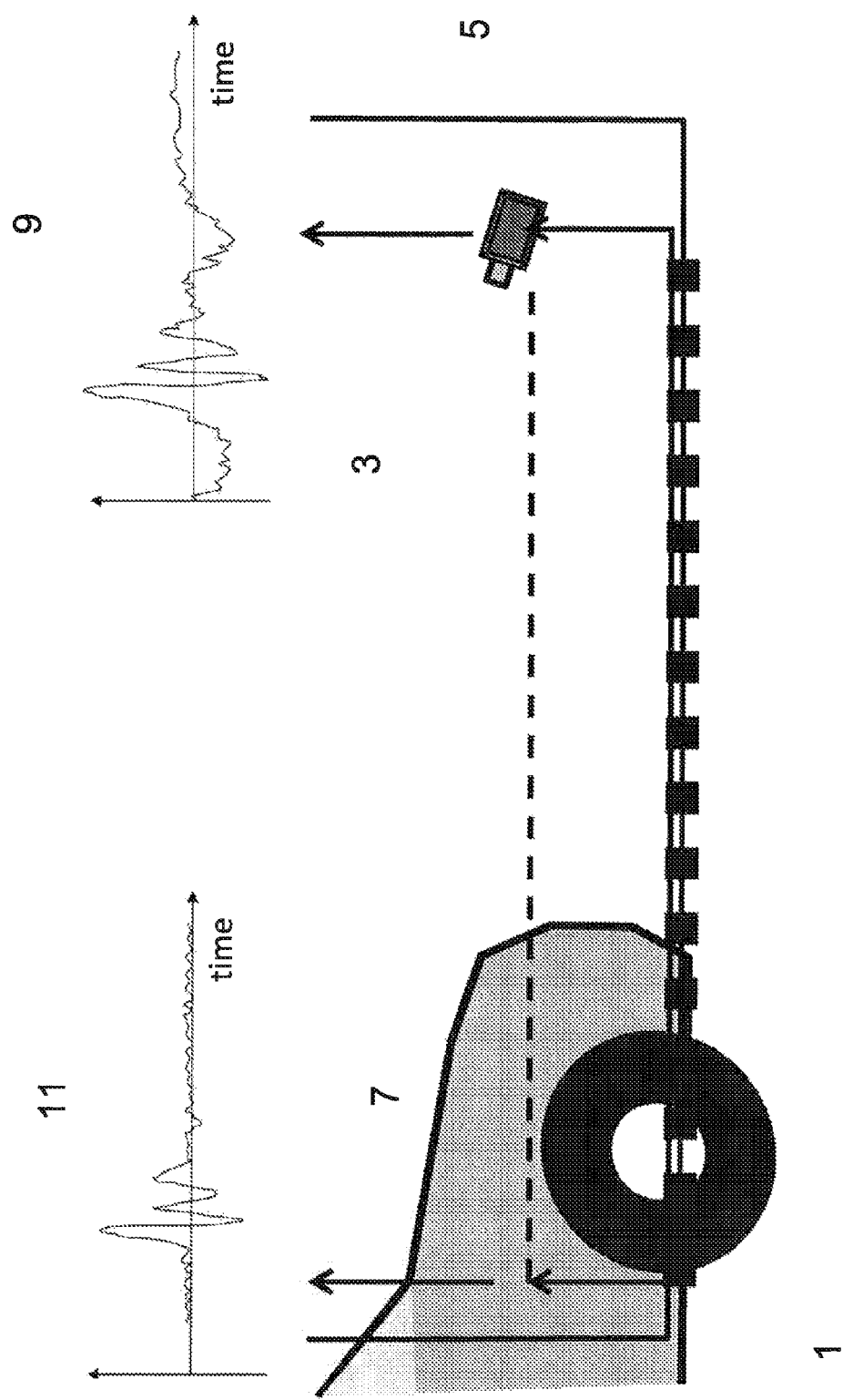
FIG. 2 is a schematic view showing further aspects of operation of the system shown in FIG. 1.

Various elements of a system as outlined above are illustrated in FIG. 1 and aspects of the proposed operation of such a system are illustrated in FIG. 2. This will be discussed herein below in greater detail. While the following example describes a car operator and a car, it will be appreciated that this only is by way of illustration, and that the embodiments could be used in many other situations, including building access and nautical and aviation applications.

There are two aspects to this system, first, measuring movement of the key, and then performing a security check to verify that the key is indeed close to the base unit and that the information from the key is not being forwarded through a relay attack. The base unit is located at the vehicle or building being protected, and access to the restricted environment of the vehicle or building is thereby secured (the restricted environment can refer to the interior of the vehicle or building, and/or to commencing operation of the vehicle or building).

Measuring Movement:

With reference to FIG. 1, the starting point for this system involves measuring at both communication sides (the movable side (key 5) and the relatively stationary base side (vehicle 1)) the movement history of at least one of those sides. Preferably, movement of the movable side key 5 is measured. In the context of a car access system, this could be effected by providing a vehicle key 5 with one or more accelerometers, gyroscopes and/or compasses (not shown) so that the key 5 can measure and record its own movements. Meanwhile, the car 1 uses a radio link 7 that is preferably separate from the encrypted low-frequency link 3 enabling vehicle access and operation to measure independently the movement of the key 5. By way of non-limiting example, radio link 7 could be an ultra-wideband (UWB) link suitable for UWB ranging.

Communication Security Check:

When the key 5 wants to communicate with the car 1 for the purpose of opening the car door(s) and/or starting the car, then the movement history of the key 5 is exchanged with the car 1 to validate that the car 1 is indeed talking directly with the key 5. This verification can prevent a relay attack.

When the car 1 needs to verify that the key 5 is in proximity to the car 1, the key 5 can send the key movement history data collected by the key 5 over the encrypted radio link 3. The car 1 can then validate the received data and determine whether the key 5 is actually in physical proximity to the car 1.

Figure 3:
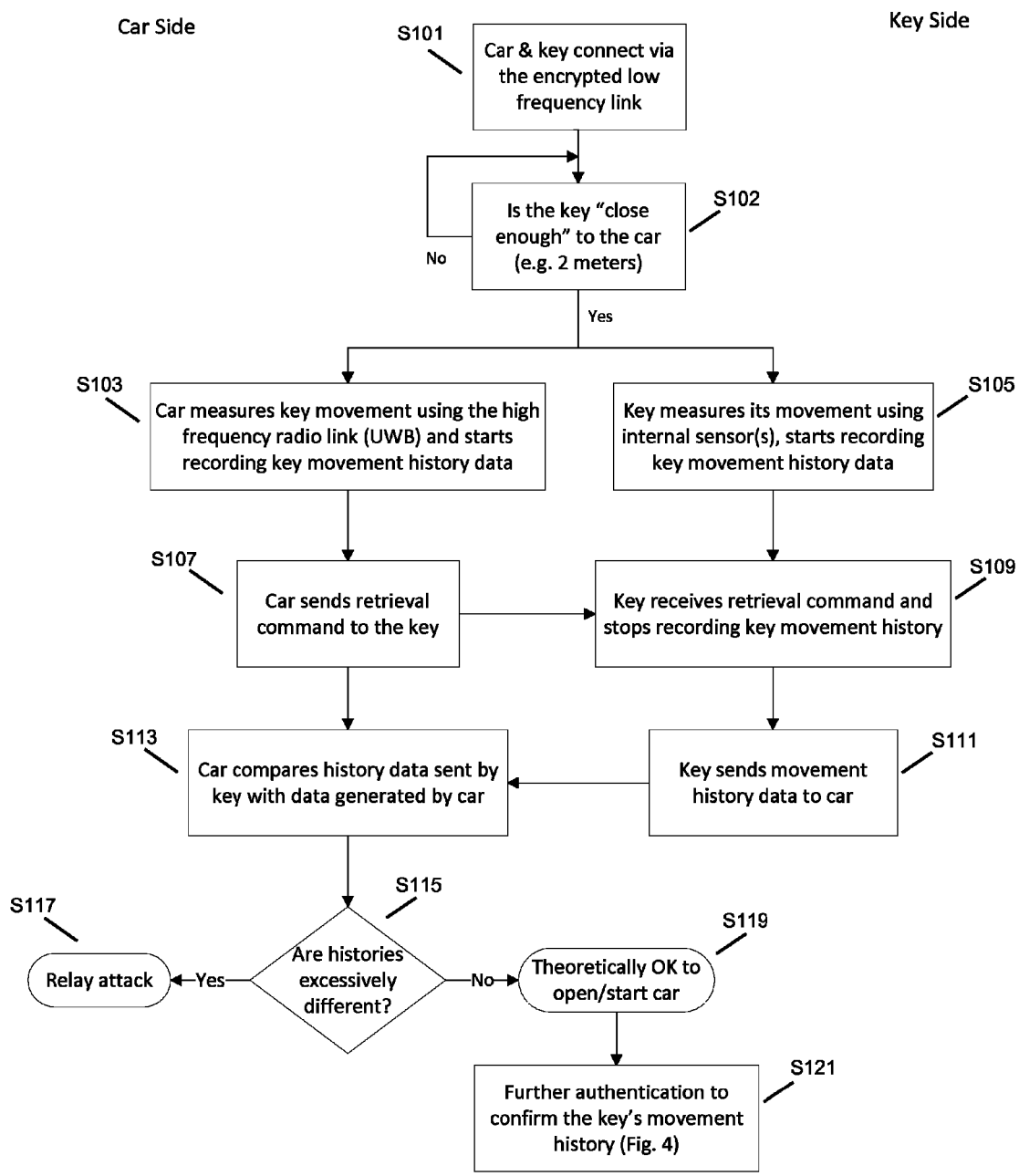
FIG. 3 is a flowchart depicting operation of a system detecting a relay attack in accordance with aspects of this invention.

With reference now to FIGS. 1 and 3, such validation by the car 1 can be performed through the following steps:

1. First, the car 1 and the key 5 set up a communication connection (initiated with a "handshake" operation), such that data can be exchanged over the encrypted low frequency radio link 3, as in step S101. In step S102 a check is made whether the key is sufficiently close to the car (e.g. 2 m), for example, through the car's use of the high frequency measurement band to locate the key (FIGS. 1 and 2). If the answer is no, the system waits until the key is sufficiently close.

2. Once the key is sufficiently close to the car, both the car 1 and the key 5 start recording (independently) key movement history data 9 after the handshake has been accomplished, as in steps S103 and S105. The car 1 generates the movement history data 9 for the key 5 using radio link 7, which is suitable for accurate measurement of the key's position relative to the car 1, e.g., by UWB ranging. By way of example only and not limitation, FIG. 1 depicts movement history data 9 recorded by the key showing acceleration (y-axis) as a function of time (x-axis); other movement parameters such as position, velocity or acceleration in a particular direction, or environmental brightness, or ambient sound also could be used.

3. At a certain time after the encrypted communication link 3 has been established, the car 1, in step S107, sends a signal ("retrieval command") to the key 5 so that the car 1 can retrieve the movement history data 9 from the key 5.

4. When the key 5 receives the retrieval command from the car 1 in step S109, the key 5 stops recording its movement history (the key 5 keeps recording its movement history data until it receives the retrieval command).

5. The key 5 then sends its movement history data 9 to the car 1 in step S111.

At this stage, the car 1 could in step S115 compare the movement history data 9 sent by the key 5 (step S113) with the movement history determined separately by the car. If the histories are excessively different as in step S117 (excessive meaning the histories are so different they do not correspond to (or reflect) the same movement history of the key 5), it follows that the key 5 in fact is not in the vicinity of the car 1, meaning a relay attack is presumably taking place. In this situation, the car 1 should not unlock its door or start the engine. Optionally, the car 1 could cause an alert to be sent to the vehicle owner or police notifying them that an attempt has been made to compromise the vehicle's security, for example, by e-mail or text message.

By way of non-limiting example, FIG. 2 depicts two different movement histories 9 and 11, and comparison of those histories will show that, while they are similar, they are not identical.

Figure 4:
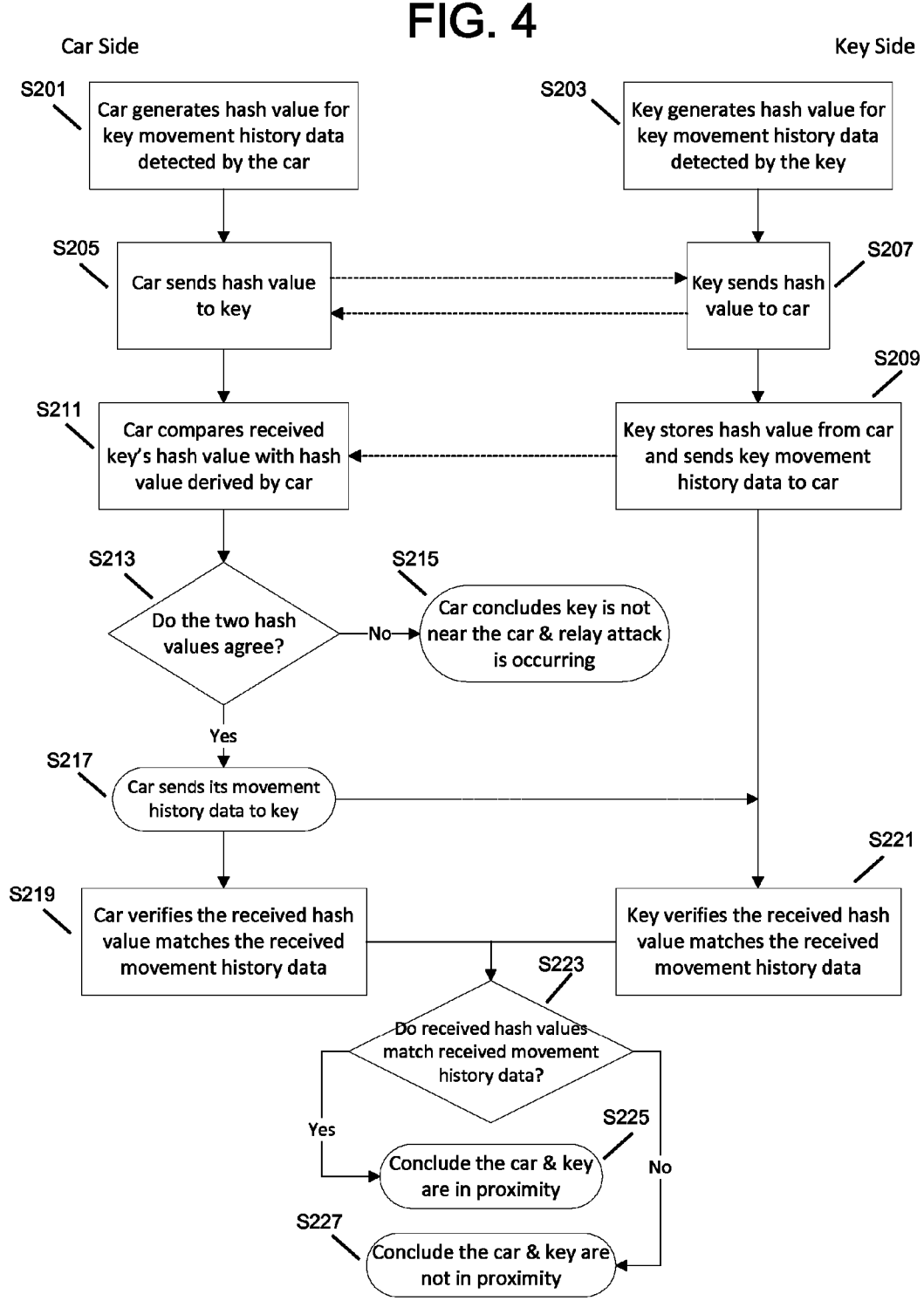
FIG. 4 is a flowchart depicting further aspects of the operation of FIG. 3 for verifying a determination that no relay attack is taking place.

Should the car 1 and key 5 independently show in step 115 the same movement history for the key 5, "same" meaning that the histories are not excessively different (a suitable data analysis scheme could be employed to make this determination), in theory the car could be opened/started, as in step S119. However, showing the same movement histories in this step is not sufficient to guarantee that the key is indeed in the vicinity of the car 1, as a successful relay attack could be taking place (in contrast, if a comparison of the key movement histories shows a difference between the histories which is sufficient to suggest a relay attack is taking place, that conclusion can be trusted and corresponding action can be taken). Thus, additional steps can be taken to determine whether the key 5 truly is in the immediate presence of the car 1, as in step S121, leading to FIG. 4.

For example, with reference to FIGS. 1 and 2, during a relay attack, either side (key 5 or car 1, most likely, the key 5) could copy key movement history data 9 from the other side and, possibly by adding some noise to such key movement history data 9, pretend that the altered data is its own movement history data. In the typical scenario, the unauthorized person attempting to emulate the key 5 most likely would alter the key movement history 9 sent by the key 5 to the car 1 to fool the car 1 into thinking that the unauthorized person is nearby. To prevent such a "spoofing" attack, the following further mutual authentication steps shown in FIGS. 2 and 4 can be taken in place of (meaning it is always performed) or in addition to (meaning it is only performed under certain circumstances) step 5 above:

5'. In step S203, the key 5 generates a hash value for the key movement history data 9 detected by the key 5 using a predetermined cryptographic hash function (e.g. MD5 or SHA-256). The key 5 then sends this hash value to the car 1 in step S207. This can take place over the encrypted low frequency radio link 3 (FIG. 2).

6. In step S201, the car 1 likewise calculates a hash value for the key movement history data 9 that the car 1 detected using the measuring radio link 7, and sends that hash value to the key 5 in step S205; this can take place over the encrypted low frequency radio link 3 (FIG. 2).

7. Once the key 5 has received the hash value from the car 1 the key 5 stores it and sends its own data to the car in step S209; this can take place over the encrypted low frequency radio link 3 (FIG. 2).

8. The car, in step S211, then compares the hash value received from the key 1 with the hash value derived by the car 1, and if in step S213 those two values are in agreement, the car 1 sends its movement history data to the key in step S217; this can take place over the encrypted low frequency radio link 3 (FIG. 2). By having the car send its movement history data to the key, the key can verify that it is communicating with the car, and not an unauthorized entity. In some instances, possibly to save time and/or power, this action may be omitted.

The hash values should be exchanged before the movement histories to increase security, since a side having a movement history would be able to derive the corresponding hash value and thereby falsify a hash value match, thwarting the security of the system. Only after the hash values have been transmitted and received should the actual movement histories be exchanged. Upon receipt of a movement history, the hash value of the received movement history is recalculated at the reception side and compared at the reception side to the previously received hash value. If these hash values differ, the movement history should be rejected. Only when the hash values are identical would the movement histories be compared (the hash values are so-called cryptographic "commitments" that prevent the alteration of data that is sent at the later stage).

Both car 1 in step S219 and key 5 in step S221 verify that the received hash value matches the received movement history data. If in step S223 the received hash value does not match, they conclude that the car and the key are not in physical proximity in step S227. The key-side verification of the hash value received from the car is an additional security measure that helps make this system difficult to defeat (meaning there may be applications where key-side verification of the hash value from the base can be omitted).

If the car and key hash values and movement history data match, they continue with validating the 2 sets of data and conclude from that whether the car and the key are in physical proximity in step S225.

Figure 5:
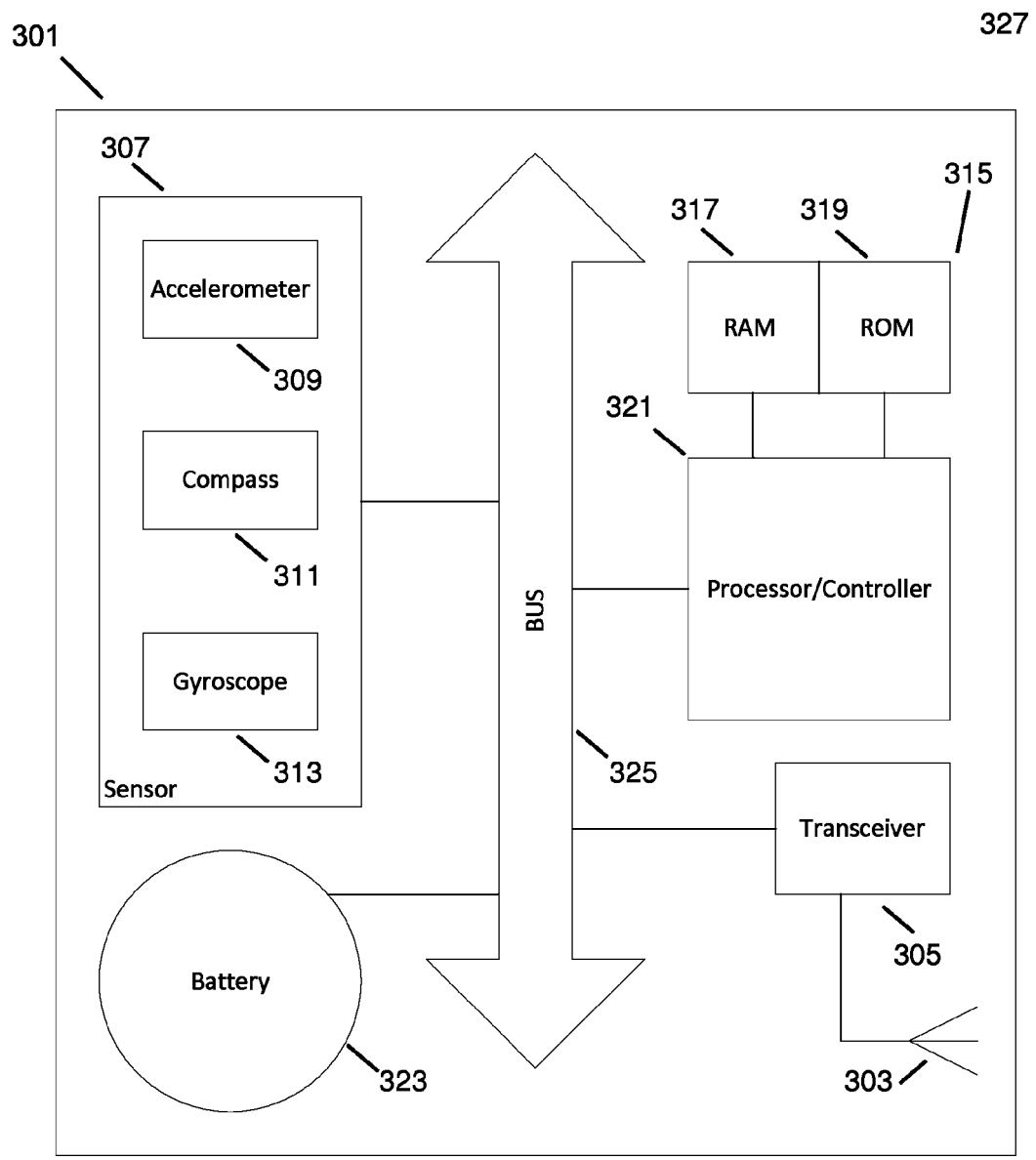
FIG. 5 is a schematic block diagram of a key which can operate as described.

The key as described above can be constructed as shown in FIG. 5, wherein the key 301 uses discrete electronic components, e.g., an antenna 303, transceiver 305, sensor(s) 307 (which could include at least one of an accelerometer 309, compass 311, and gyroscope 313), memory 315 (which can be divided into ROM program memory 317 and RAM working memory 319), processor/controller 321, and a battery 323 serving as power source, all interconnected via suitable structure such as a bus 325 (different buses could be used if necessary due to different operating parameters of the different components, such as power supply and power schemes). ROM program memory 317 can include instructions which, when executed by the processor/controller 321, cause the key 301 to operate as described above. The architecture in FIG. 5 is by example only and not limitation, and any other suitable architecture also could be employed.

Alternatively, the key could include an application-specific integrated circuit (ASIC) (not shown) having all of the components and functionality required for this invention, along with a battery for driving the ASIC.

Various exemplary embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

To the extent positional designations such as top, bottom, upper, lower have been used in describing this invention, it will be appreciated that those designations are given with reference to the corresponding drawings, and that if the orientation of the device changes during manufacturing or operation, other positional relationships may apply instead. As described above, those positional relationships are described for clarity, not limitation.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. A passive keyless device for selectively accessing a restricted environment of a base, comprising:
   at least one sensor configured to detect a movement property of the device;
   a recording element configured to store movement history information regarding the device, the movement history information reflecting the movement property detected by the sensor over a period of time;
   a transceiver configured to communicate with the base, and transmit to the base at least one of encrypted security information identifying the passive keyless device in accordance with a passive keyless protocol, and the movement history information, and
   an access request element configured to cause the transceiver to send a request for access to the base.

2. A passive keyless device according to claim 1, wherein the sensor includes at least one of an accelerometer, a gyroscope, and a compass.

3. A passive keyless device according to claim 1, further comprising:
   a hash value generator,
   wherein the hash value generator is configured to derive a hash value from the movement history information, and
   wherein the transceiver is configured to send the hash value to the base.

4. A passive keyless device according to claim 3, wherein the hash value generator employs at least one of a MD5 cryptographic hash function and a SHA-256 cryptographic hash function.

5. A passive keyless device according to claim 3, wherein the transceiver is further configured to receive from the base at least one of a base measured movement history information for the passive keyless device and a base hash value corresponding to the base measured movement history information, and further comprising:
   a controller which inhibits the access request element if at least one of the base measured movement history information and the base hash value received from the base differ by more than predetermined amounts from the movement history information and the hash value.

6. A passive keyless entry device according to claim 5, wherein the hash value is sent by the transceiver before the movement history is sent by the transceiver.

7. A passive keyless device according to claim 1, wherein selectively accessing the restricted environment includes at least one of opening a vehicle door, starting a vehicle engine, and opening a building door.

8. A passive keyless system, comprising:
   a base configured to selectively allow access to a restricted environment, the base having;
      a base transceiver configured to operate using an encrypted link on a first frequency associated with security information and a second frequency associated with distance measurement information, and
      a base recording element configured to store base measured movement history information based upon the distance measurement information; and
   a passive keyless device having;
      at least one sensor configured to detect a movement property of the device,
      a device recording element configured to store movement history information regarding the device, the movement history information reflecting the movement property detected by the sensor over a period of time,
      a device transceiver configured to communicate with the base transceiver, and transmit to the base transceiver at least one of encrypted security information identifying the device in accordance with a passive keyless protocol, and the movement history information, and
      an access request element configured to cause the device transceiver to send a request for access to the base transceiver,
   wherein the base is configured to use the base measured movement history information and the movement history information when allowing access to the restricted environment.

9. A passive keyless system according to claim 8, wherein the sensor includes at least one of an accelerometer, a gyroscope, and a compass.

10. A passive keyless system according to claim 8, further comprising:
   a base hash value generator which is part of the base; and
   a device hash value generator which is part of the device;
      wherein the base hash value generator is configured to derive a base hash value from the base measured movement history,
      wherein the device hash value generator is configured to derive a device hash value from the movement history information, and
      wherein the device transceiver is configured to send to the base transceiver at least one of the device hash value and the movement history information, and the base is configured to use at least one of the received device hash value and the movement history information when allowing access to the restricted environment.

11. A passive keyless system according to claim 10, wherein the base denies the request for access if at least one of the base measured movement history information and the base hash value differ by more than predetermined amounts from the movement history information and the device hash value.

12. A passive keyless system according to claim 10, wherein the base hash value generator and the device hash value generator both employ at least one of a MD5 cryptographic hash function and a SHA-256 cryptographic hash function.

13. A passive keyless entry system according to claim 10, wherein the device hash value is sent by the device transceiver before the movement history information is sent by the device transceiver.

14. A passive keyless system according to claim 8, further comprising:
- a controller that is part of the passive keyless device and which is configured to inhibit the access request element if at least one of the base measured movement history information and the base hash value differ by more than predetermined amounts from the movement history information and the hash value.

15. A passive keyless system according to claim 8, wherein allowing selective access to the restricted environment includes at least one of opening a vehicle door, starting a vehicle engine, and opening a building door.

16. A method of controlling access to a restricted environment through use of a passive keyless device and a base located proximate to the restricted environment, comprising:
- detecting a movement property of the device;
- storing, at the device, device movement history regarding the device, the device movement history reflecting the movement property detected over a period of time;
- measuring, at the base, movement of the device over the period of time;
- storing, at the base, a base measured movement history of the device reflecting the movement of the device over the period of time;
- transmitting from the device to the base at least one of encrypted security information identifying the device in accordance with a passive keyless protocol, and the device movement history; and
- using, at the base, the base measured movement history and the device movement history to control access to the restricted environment,
- wherein the base and the device exchange access security information using an encrypted link on a first radio frequency, and the measuring, at the base, uses a second radio frequency.

17. A method according to claim 16, further comprising:
- deriving, at the base, a base hash value using the base measured movement history;
- deriving, at the device, a device hash value using the device movement history;
- sending to the base at least one of the device hash value and the device movement history; and
- using at least one of the device hash value and the device movement history to control access to the restricted environment.

18. A method according to claim 17, further comprising denying access to the restricted environment if at least one of the base measured movement history and the base hash value differ by more than predetermined amounts from the device movement history and the device hash value.

19. A method according to claim 17, wherein the device hash value is sent before the device movement history information is sent.

20. A method according to claim 16, wherein selectively accessing a base includes at least one of opening a vehicle door, starting a vehicle engine, and opening a building door.

* * * * *